May 3, 1966  J. D. FLORIA  3,248,965
STEERING MECHANISM
Filed Aug. 16, 1965  2 Sheets-Sheet 1
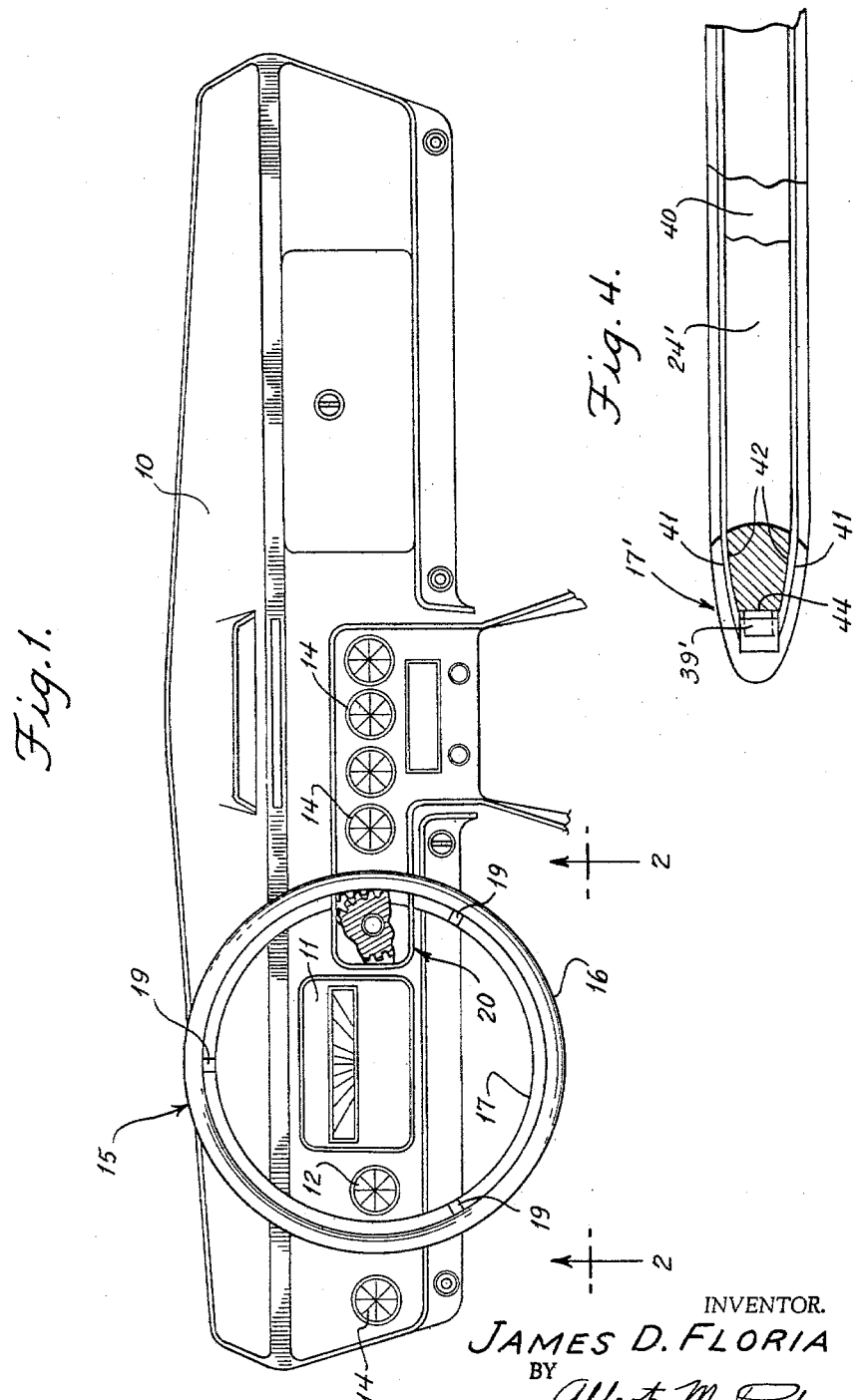
INVENTOR.
JAMES D. FLORIA
BY
Albert M. Parker
ATTORNEY.

May 3, 1966  J. D. FLORIA  3,248,965
STEERING MECHANISM
Filed Aug. 16, 1965                                    2 Sheets-Sheet 2
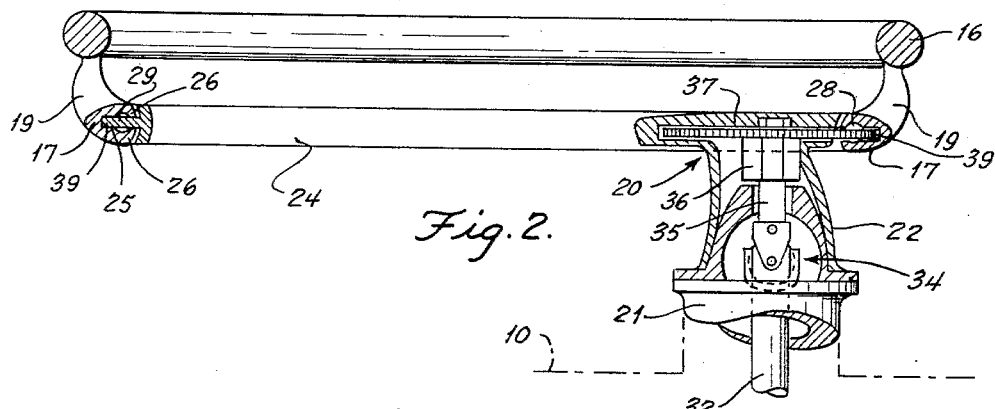
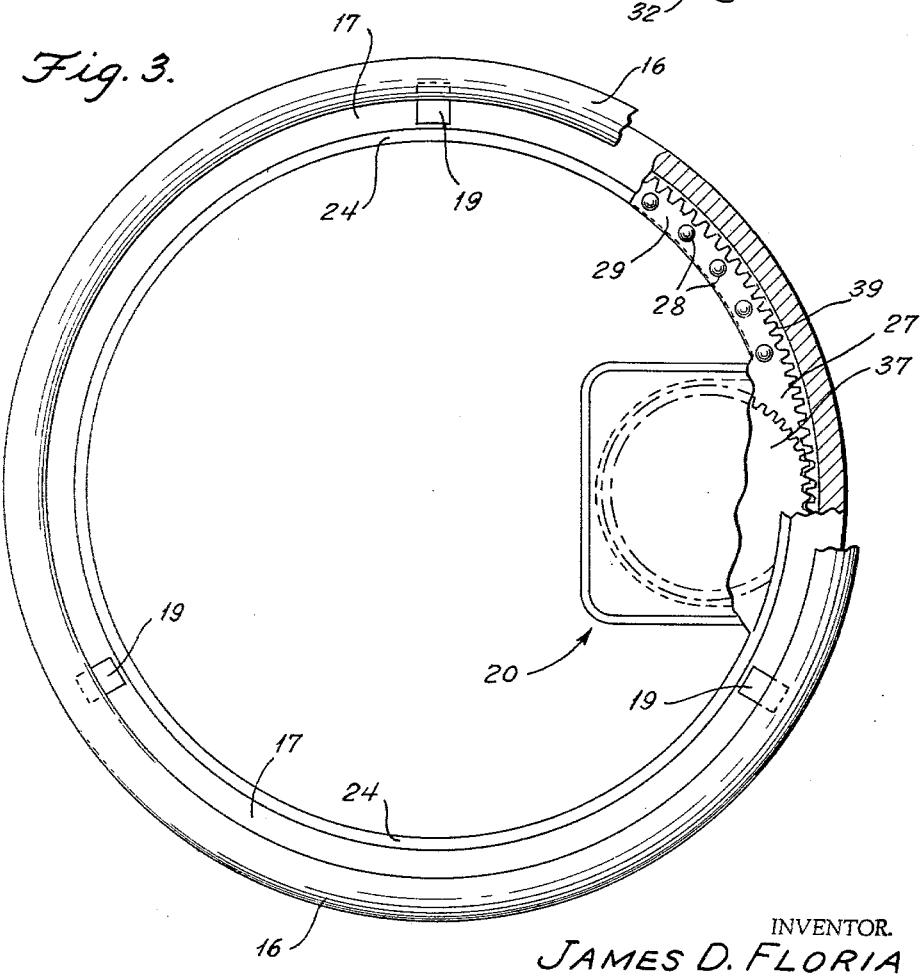
INVENTOR.
JAMES D. FLORIA
BY
Albert M. Parker
ATTORNEY.

United States Patent Office 3,248,965
Patented May 3, 1966

3,248,965
STEERING MECHANISM
James D. Floria, 193 W. North Ave., Westport, Conn.
Filed Aug. 16, 1965, Ser. No. 479,811
6 Claims. (Cl. 74—552)

This invention relates to a steering mechanism such as that for an automobile, and more particularly relates to a steering mechanism having a novel mounting mechanism which both permits the steering wheel of the mechanism to be made essentially without spokes and greatly improves the safety of the steering wheel under driving conditions.

It has become increasingly apparent that the steering column of an automobile, positioned as it is, in conventional steering mechanisms, directly in front of the driver, constitutes a very serious hazard. Thus in the case of very sudden stops as during front end collisions, the driver is frequently forcibly thrown against the steering wheel and, when the steering wheel collapses, against the upper end of the steering column. This frequently happens even though the automobile is provided with seat belts, since seat belts except for the so-called shoulder type do not restrain the upper portion of the torso of the driver from forward motion in front end collisions. The conventional, centrally mounted spoked steering wheel not only is subject to the above disadvantages, but its use results in the masking or partial masking of what would otherwise be the most useful, most easily observed portion of the instrument panel. Thus the spokes of the wheel in certain of its positions cover the instrument or portion of instrument which is directly in line with it. If such instrument should be the speedometer, the needle or other speed-indicating device thereof may be completely obscured by a spoke of the wheel.

The steering mechanism in accordance with the invention incorporates a novel steering wheel and mounting therefor whereby the steering wheel is made essentially spokeless, with the main portion of the area within the rim of the wheel presenting a clear sight path to the instrument panel. Further, in accordance with the present invention the steering wheel is connected to the steering column at one side of the driver's normal position, so that should the driver be thrown forward with sufficient force to collapse the wheel the upper rigid portion of the steering column will pass by him, and not tend to impale him as would the conventional centrally mounted steering column employed with spoked wheels.

It is accordingly among the objects of the present invention to provide a steering mechanism for a dirigible vehicle employing a novel essentially spokeless steering wheel.

A further object of the invention lies in the provision in such steering mechanism of a novel side mounting for the steering wheel whereby to increase the safety of the vehicle provided therewith.

Yet another object of the present invention lies in the provision in such steering mechanism of a novel steering wheel whereby the steering wheel may be conveniently gripped at any place in its periphery without interference by the mounting mechanism for the steering wheel.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a fragmentary view in front elevation of the instrument panel of an automobile provided with a preferred embodiment of steering mechanism in accordance with the invention, the view being taken in a direction from the rear to front, a portion of the housing for the mounting mechanism for the steering wheel being broken away;

FIG. 2 is a view partially in bottom plan and partially in section through the steering wheel and the mounting mechanism therefor shown in FIG. 1;

FIG. 3 is an enlarged view in front elevation taken in a manner similar to FIG. 1 of the steering wheel and the upper portion of the mounting mechanism therefor, portions of the housing of such mounting mechanism and of the steering wheel being broken away for clarity of illustration; and FIG. 4 is a fragmentary view in radial section through a modified steering wheel in accordance with the invention.

Turning now to the drawings, there is somewhat schematically shown in FIG. 1 a dash board or instrument panel, generally designated 10, of an automobile. Such dash board may be padded, if desired, in accordance with modern approved safety practice. Typical instruments on such instrument panel are a speedometer and odometer 11, and an oil pressure gauge 12, and various other instruments 14 which may include, of course, an ammeter, clock, and so forth. The steering wheel of the invention, which is generally designated 15, is placed adjacent the left end of the instrument panel and in the embodiment shown encompasses the line of sight of the driver to the instruments 11 and 12. The steering wheel 15, being without conventional spokes extending inwardly to its center, thus presents a clear view of the instruments 11 and 12 regardless of the angular position which the wheel may occupy.

As will be more readily seen in FIGS. 2 and 3, the steering wheel 15 includes a larger diametered separate outer and upper wheel 16 which is adapted for gripping by the driver's hands, and an inner, lower wheel member 17 by means of which the steering wheel 15 is supported and through which it drives the steering mechanism proper of the vehicle. In the embodiment shown, the outer, upper steering wheel 16 is attached to the inner, lower wheel 17 by a plurality of short, radially directed rudimentary spokes 19, the space between the wheel 16 and the member 17 exceeding that necessary to receive the fingers of the driver's hands. The outer wheel 16 is thus substantially separated from and free of attachment to both the inner wheel 17 and the wheel supporting mechanism 20 with the exception of the members, 19 so that the wheel 16 may be gripped by the driver over its entire circumference in the normal manner.

The mechanism for supporting the steering wheel 15 and specifically the lower inner wheel member 17 thereof is generally designated 20. In the embodiment shown, such mounting mechanism is disposed at the right of the wheel 15 and is thus in a position so that it will pass by the right hand side of the driver should the driver be thrown forward from his normal driving position forcibly enough for his chest to engage and collapse the wheel 15. It is to be understood that the mounting mechanism 20 might, as an alternative, be mounted at the left side of the wheel. The mounting mechanism 20 includes an outer, angularly upwardly directed tubular housing 21 which is connected to the frame of the vehicle and extends from the instrument panel 10. Connected to the upper end of the column 21 is a housing member 22 which cooperates with the inner wheel member 17 to support it while permitting the rotation of the wheel 15 about its axis in the following manner.

The housing portion 22 is formed at the upper end thereof with an annular guide track member 24 which is made, for example, of steel, and is disposed in a plane normal to the axis of the column 21. The guide track member 24 is of circular form and is continuous except for a gap therein designated 27 which extends generally from the ends of the housing 20. The annular guide member 24 is rounded on its radially inner surface as shown in FIG. 2 and has an axially centrally disposed radially outwardly extending flange 29 on its outer surface. The inner steering wheel member 17 is provided with a radially inwardly open slot or groove 25 which accurately but rotatably receives therewithin the flange 29 on the supporting member 24. In order to permit the inner steering wheel member 17 to rotate freely with respect to the support 24, the flange 29 of the support is provided with a plurality of holes therealong, each such hole containing a ball 28 which fits within a correspondingly shaped annular groove 26 in the member 17. Thus there are in effect provided a ball bearing and a race therefor in the connection between the support 24 and the inner steering wheel member 17.

Within the hollow steering column 22 there is mounted a steering shaft 32 which is connected to the steering mechanism, including the linkage (not shown) between the front wheels of the vehicle, in a conventional manner. The upper end of the shaft 32 is preferably connected by a universal joint 34 to a stub shaft 35 which is journalled for rotation in a bearing member 36 connected within the upper outer housing portion 22. A pinion 37 is fixedly connected to the upper end of shaft 35. The pinion 37 meshes with an annular inner ring gear 39 which is mounted within the groove 25 in member 17 and is connected to such member.

It will thus be seen that the steering wheel 15 is rotated by the turning of the hand gripped portion 16 thereof which through the members 19 causes the inner wheel portion 17 to turn with it. Such wheel portion 17 then drives the pinion 37 by reason of the meshing engagement between the annular gear 39 and such pinion, thereby steering the vehicle in the desired direction.

In FIG. 4 there is fragmentarily shown a portion of a modified steering wheel in accordnace with the invention. Parts similar to those of the steering wheel 15 of FIGS. 1, 2, and 3 are designated by the same reference characters with added primes. The inner lower wheel 17' is shown provided with a truncated V-shaped groove, the sides 41 of which diverge in a radially inward direction. The annular support 24' has a peripheral surface which is complementary to and accurately fits within the groove 40. The sides 41 of the groove 40 in member 17' thus form bearing surfaces which slide upon the surfaces 42 of member 24' as the steering wheel is turned. The outer surface 44 of member 24' is radially spaced inwardly from the inner surface of the ring gear 39' affixed to member 17' at the root of the groove 40 therein. It will be understood that the ring gear 39' meshes with a pinion within a mounting housing (not shown in FIG. 4) to drive a steering shaft, as in the first described embodiment of FIGS. 1, 2, and 3.

Although only a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus the steering mechanism of the invention may be employed with right hand drive automobiles, the mounting mechanism for the wheel being then mounted either on the right or left hand side of the axis of the steering wheel.

What is claimed is:
1. A steering mechanism for a dirigible wheel vehicle, said vehicle having a body and a station therein adapted to be occupied by the operator of the vehicle, said mechanism comprising a steering column affixed to the vehicle body and rising therefrom to one side of the operator's station, a support mounted on the upper end of the steering column, a steering wheel having an annular body, means mounting the steering wheel body on said support eccentrically with respect to the support and substantially centered at the operator's station, said column surrounding a steering shaft extending to said support, and means drivingly connecting the steering wheel body to the shaft.

2. A steering mechanism as in claim 1, wherein the steering wheel including the body thereof is entirely open in its central portion, and comprising a centrally open annular member of generally the same diameter as the steering wheel body mounted on the support on one side of said member, the steering wheel body being mounted on the annular member concentrically thereof for rotation with respect thereto.

3. A steering mechanism as in claim 2, wherein the annular member has a gap therein at the location of the support, and the means drivingly connecting the steering wheel body to the shaft includes an internal ring gear mounted on the steering wheel body concentrically thereof, and a pinion journalled on the support and meshing with the ring gear drivingly connected to the shaft.

4. A steering mechanism for a dirigible wheeled vehicle having a body and a station therein adapted to be occupied by the operator of the vehicle, said mechanism comprising a steering column affixed to the vehicle rising therefrom to adjacent the operator's station, a support mounted on the upper end of the steering column, a steering wheel having an annular body in the form of a first, lower wheel, means at a location adjacent one peripheral zone of the annular body mounting the annular body on said support with the annular body substantially centered at the operator's station, a steering shaft within the column and extending to said support, means drivingly connecting the annular body to the shaft, and a second wheel adapted to be gripped by the hands of the operator, mounted concentrically above the first wheel and connected thereto to rotate therewith.

5. A steering mechanism as in claim 4, wherein the means connecting the first and second wheels comprises short generally radially directed spokes spanning between and connected to the first and second wheels.

6. A steering mechanism as in claim 5, wherein the first and second wheels are entirely open in their central portions, and comprising a centrally open annular member of generally the same diameter as the first wheel mounted on the support, the first steering wheel being mounted on the annular member concentrically thereof for rotation with respect thereto.

References Cited by the Examiner

UNITED STATES PATENTS

| | | | |
|---|---|---|---|
| 2,203,852 | 6/1940 | Wells | 74—471 |
| 2,442,288 | 5/1948 | Floria | 180—90 |

FOREIGN PATENTS

| | | |
|---|---|---|
| 624,304 | 4/1927 | France. |
| 1,124,131 | 6/1956 | France. |
| 1,110,028 | 6/1961 | Germany. |
| 897,011 | 5/1962 | Great Britain. |

BROUGHTON G. DURHAM, *Primary Examiner.*

C. F. GREEN, *Assistant Examiner.*